United States Patent Office 3,740,305
Patented June 19, 1973

3,740,305
COMPOSITE MATERIALS BONDED WITH SILOXANE CONTAINING POLYIMIDES
John T. Hoback and Fred F. Holub, Schenectady, N.Y., assignors to General Electric Company
No Drawing. Filed Oct. 1, 1971, Ser. No. 185,904
Int. Cl. B32b 27/04, 17/06; C09j 3/00
U.S. Cl. 161—183                                    15 Claims

ABSTRACT OF THE DISCLOSURE

Composite materials are prepared by treating materials with a siloxane containing polyamic acid block copolymers and thereafter converting the polyamic acid to the polyimide state. The polyamic acid block copolymers are obtained from the reaction of an organic diamine, an organic tetracarboxylic dianhydride, and a polysiloxane diamine in a suitable organic solvent.

---

Recently considerable interest has been shown in polysiloxane amides and polysiloxane amide imides useful for insulation and protective purposes where resistance to heat and corona are important requirements. Holub et al. in U.S. Pat. 3,598,784 discloses the preparation of polysiloxane amides and polysiloxane amide imides from the reaction of an organic diamine, a tetracarboxylic dianhydride and a polysiloxane containing terminal silicon-bonded

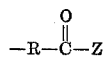

groups, wherein R is a divalent hydrocarbon radical, and Z is a halogen, hydroxyl or methoxy radical.

In our copending application, Ser. No. 185,905 and filed Oct. 1, 1971, we have disclosed that a prepolymer can be formed by the reaction of a siloxane containing diamine, trimellitic anhydride and an organic diamine. These prepolymers can then be reacted with dianhydrides to form polymers which are useful for preparing films, coatings and adhesives with corona resistance which cure to novel polyamide-imides. The polymers when coated on fibers such as glass, boron, quartz, and carbon fibers or fabric and various finely divided materials such as metals, carbon, quartz alumina and other ceramics represent coated material structures which have good adhesion to the polymeric matrix.

In accordance with the present invention, we have discovered a method of making a composite material by (a) Forming in a solvent a fluid of a block copolymer having recurring structural units of the formula:

(I)

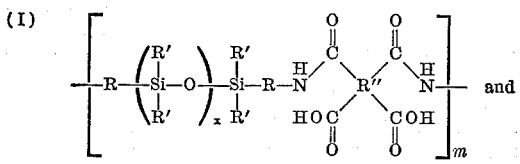 and

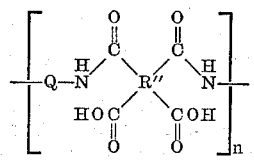

wherein R is a divalent hydrocarbon radical, R' is a monovalent hydrocarbon radical, R'' is a tetravalent or-ganic radical, Q is a divalent organic radical which is the residue of an organic diamine, x is an integer having a value of 1–4, m is an integer greater than 1, n is an integer greater than 1, and the recurring units designated by m and n are such that the mol percent of m is equal to 5–50% of the polymer, (b) Applying a coating of the fluid to the surface of a first substrate material selected from the group consisting of glass, ceramics, metals, and thermoplastic polymers, (c) Attaching to said coated first material a second substrate material selected from the same group as said first material, and (d) Converting said block copolymer of Formula I to the corresponding imide to form a bonded composite material. The invention also includes the composite materials bonded with block copolymer of Formula I obtained by the described process.

The block copolymer of Formula I above can be prepared by effecting a reaction of a mixture of ingredients comprising a diamino siloxane of the general formula:

(II)

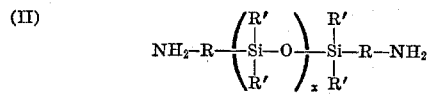

a diamino compound of the formula:

(III)                    $NH_2—Q—NH_2$ and a tetracarboxylic acid dianhydride having the formula:

(IV)

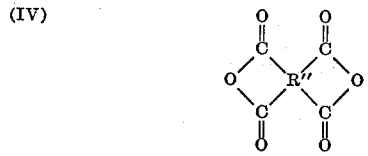

wherein R, R', R'', Q and x have the meanings given above.

The diamino siloxanes of Formula II which may be used in the practice of the present invention are limited in that when x is 5 or more they lose their adhesive properties and, consequently, x may equal 1–4. These include compounds having the following formulas:

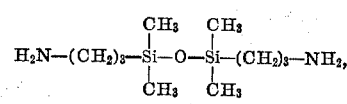

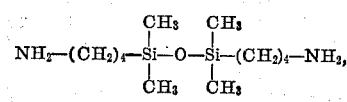

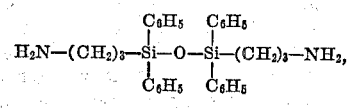

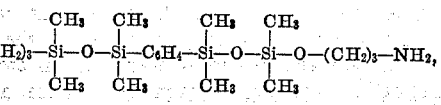

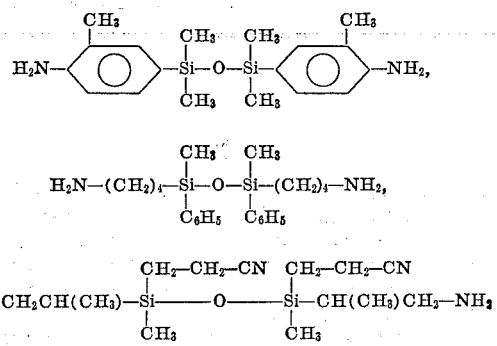

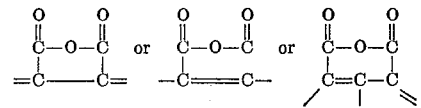

etc.

The diamines of Formula III above are described in the prior art and are to a large extent commercially available materials. Typical of such diamines from which the prepolymer may be prepared are the following:

m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;

and mixtures thereof. It should be noted that these diamines are given merely for the purpose of illustration and are not considered to be all inclusive. Other diamines not mentioned will readily be apparent to those skilled in the art.

The tetracarboxylic acid dianhydrides of Formula IV may further be defined in that the R" is a tetravalent radical, e.g., a radical derived from or containing an aromatic group containing at least 6 carbon atoms characterized by benzenoid unsaturation, wherein each of the 4 carbonyl groups of the dianhydride are attached to a separates carbon atom in the tetravalent radical, the carbonyl groups being in pairs in which the groups in each pair are attached to adjacent carbon atoms of the R radical or to carbon atoms in the R radical at most one carbon atom removed, to provide a 5-membered or 6-membered ring as follows:

$$\begin{matrix} O & O \\ \| & \| \\ C-O-C \\ | & | \\ =C——C= \end{matrix} \quad \text{or} \quad \begin{matrix} O & O \\ \| & \| \\ C-O-C \\ | & | \\ -C===C- \end{matrix} \quad \text{or} \quad \begin{matrix} O & O \\ \| & \| \\ C-O-C \\ / & | & \backslash \\ C=C-C \end{matrix}$$

Illustrations of dianhydrides suitable for use in the present invention (with their furture designation in parentheses) include:

pyromelliticdianhydride (PMDA);
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl)propanedianhydride;
bis(3,4-dicarboxyphenyl)sulfone dianhydride;
benzophenone tetracarboxylic acid dianhydride (BPDA);
perylene-1,2,7,8-tetracarboxylic acid dianhydride;
bis(3,4-dicarboxyphenyl)ether dianhydride; and
bis(3,4-dicarboxyphenyl)methane dianhydride;

and aliphatic anhydrides such as cyclopentane tetracarboxylic dianhydride, cyclohexane tetracarboxylic dianhydride, butane tetracarboxylic dianhydride, etc.

The substrate materials which may be bonded by our novel process include inorganic materials, such as metals, glass, ceramics, etc., and organic materials such as thermoplastic polymers e.g., polyimides, polyesters, polycarbonates, polyamides, etc. Composites having good adhesion can be formed using the block copolymers bonded to fibers such as glass, boron, quartz, carbon fibers and fabrics and various finely divided materials such as metals, carbon, quartz, alumina and ceramics. This procedure is particularly useful in treating glass and metallic surfaces to obtain good adhesion to organic thermoplastic polymers such as those described above.

Application of the block copolymer fluid in a suitable solvent or diluent (including, for example, N-methylpyrrolidone, N,N-dimethylacetamide, N,N-dimethylformamide and water) to the substrate material may be by conventional means such as dipping, spraying, etc. The block copolymer fluid may be dried in an initial heating step at temperatures of about 100° C. for a sufficient time frequently under vacuum to remove the solvent or diluent. The substrates in the form of sheets, fabric, fiber or particles are then sealed to one another which may and frequently involves the use of pressure. Then the amic acid is converted to the corresponding imide by heating at temperatures of about 150–300° C. for a sufficient curing time at elevated pressures preferably of about 100–500 p.s.i. to produce the bond.

In order that those skilled in the art may better understand how the present invention may be practiced, the following examples are given by way of illustration and not by way of limitation.

EXAMPLE I

To a reaction flask flushed with nitrogen were charged a mixture of 24.4 g. N-methylpyrrolidone ,15.86 g. (0.08 m.) p,p'-methylene dianiline, 5.52 g. (0.02 m.) 1,3- bis-($\delta$-aminobutyl)tetramethyldisiloxane. The mixture was stirred and then 32.22 (0.1 m.) benzophenone tetracarboxylic dianhydride was added and stirring was continued until a homogeneous viscous fluid was obtained.

The following reactions were performed by coating one side of a polymer designated as Film A as indicated, with 1 mil of the above viscous solution using a draw bar. The coated film was then heated at a temperature of about 100° C. for 1–4 hours to remove most of the volatile while the coating remains uncured. Thereafter, the coated side of the film was placed in contact with a second polymer designated as Film B. The composite was placed in a press at a temperature for curing of the coating and at a pressure (with or without vacuum) for a specified time.

TABLE I

| Experiment number | Film A | Heating step | Film B | Pressing and curing step |
|---|---|---|---|---|
| 1 | Polyimide | 100° C./1 hr | Polyimide | 250° C./300 p.s.i./30 min. |
| 2 | Polyamide | 100° C./2 hrs., 25" Hg | Polyamide | 200° C./200 p.s.i./15 min. |
| 3 | Polyamideimide | 100° C./1 hr., 25" Hg | Polyamideimide | 200° C./200 p.s.i./15 min. |
| 4 | Polyethylene terephthalate | 100° C./1 hr., 25" Hg | Polyethylene terephthalate | 150° C./300 p.s.i./30 min./25" Hg. |
| 5 | Polycarbonate | 100° C./1 hr., 25" Hg | Polycarbonate | 150° C./300 p.s.i./30 min./25" Hg. |
| 6 | Polyimide | 100° C./1 hr | Polyethylene terephthalate | 150° C./300 p.s.i./30 min./25" Hg. |
| 7 | Polyamide | 100° C./2 hrs, 25" Hg | do | 150° C./300 p.s.i./30 min./25" Hg. |

The resultinng composites of two films bonded together by the polysiloxane imide interface showed good adhesion and no evidence of blisters or bubbles in the matrix.

EXAMPLE II

Following the procedure of Example I, a mixture of 211.1 g. N-methylpyrrolidone, 17.84 g. (0.09 m.) p,p′-methylene dianiline, 2.76 g. (0.01 m.) 1,3-bis(δ-aminobutyl)tetramethyldisiloxane, was stirred and then 32.22 g. (0.1 m.) benzophenone tetracarboxylic dianhydride was added. The mixture was stirred until a homogeneous viscous fluid was obtained.

Bonded composite materials were formed using the procedure of Example I as shown in the table below:

TABLE II

| Experiment number | Film A | Heating step | Film B | Pressing and curing step |
|---|---|---|---|---|
| 8 | Polyimide | 100° C./1 hr | Polyimide | 250° C./300 p.s.i./ 30 min. |
| 9 | Polyamide | 100° C./2 hrs., 25" Hg | Polyamide | 200° C./200 p.s.i./ 30 min. |
| 10 | Polyimide ᵃ | 150° C./1 hr | Polyimide | 250° C./300 p.s.i./ 30 min. |

ᵃ 1:1 mixture of benzophenone tetracarboxylic dianhydride and methylene dianiline.

The resulting composite materials showed good adhesion and no evidence of blisters in the matrix.

EXAMPLE III

Following the procedure of Example I, a mixture of 220.4 g. N-methylpyrrolidone, 11.90 g. (0.06 m.) p,p′-methylene dianiline, 11.04 g. (0.04 m.) 1,3-bis-δ-aminobutyl)tetramethyldisiloxane was stirred and then 32.22 g. (0.1 m.) benzophenone tetracarboxylic dianhydride was added. The mixture was stirred until a homogeneous viscous fluid was obtained.

Bonded composite materials were formed, using the procedure of Example I, as shown in the table below:

TABLE III

| Experiment number | Film A | Heating step | Film B | Pressing and curing step |
|---|---|---|---|---|
| 11 | Polyimide | 100° C./1 hr | Polymide | 250° C./300 p.s.i./30 min. |
| 12 | Polyamide-imide | 100° C./2 hrs., 25" Hg | Polyamide-imide | 200° C./200 p.s.i./30 min. |

The resulting composite materials showed good adhesion and no evidence of blisters in the matrix.

EXAMPLE IV

Following the procedure of Example I and using the viscous fluid prepared from (0.08 m.) p,p′-methylene dianiline, (0.02 m.) 1,3 - bis(δ-aminobutyl)tetramethyldisiloxane and (0.1 m.) benzophenone tetracarboxylic acid anhydride, strands of glass fibers were dip-coated into the viscous fluid. The coated fibers were then cured by heating at a schedule of 100° C./15 min., 150° C./15 min., 200° C./15 min., and 300° C./15 min. Fused filaments were obtained with good adhesion between individual strands.

EXAMPLE V

Following the procedure of Example I, 32.2 g. (0.10 m.) benzophenone dianhydride was added to a solution of 16 g. (0.08 m.) p,p′-methylene dianiline, 5.5 g. (0.02 m.) 1,3-bis(δ-aminobutyl)tetramethyldisiloxane and 50 g. N-methylpyrrolidone. This mixture was then diluted with 200 g. of water. The aqueous copolymer solution was used to coat glass cloth and glass fibers to yield a thin sizing coating upon being cured at a temperature of 250–400° C. The coated glass gave good adhesion to other imides in the formation of laminates.

EXAMPLE VI

Following the procedure of Example I, attempts were made to determine the optimum compositions for making composite materials wherein the polysiloxane imide exhibited good adhesion to the substrate. The mixtures are designated in mol percent of benzophenone tetracarboxylic dianhydride+p,p′-methylene dianiline (abbreviated as BPDA–MDA) and in mol percent of benzophenone tetracarboxylic dianhydride+1,3 - bis(δ-aminobutyl)tetramethyldisiloxane (abbreviated as BPDA–SDA). The compositions and the properties of the cured product using standard procedures are set forth in the table below:

TABLE IV

| Experiment number | Composition (mol percent) | | Cured film integrity | Cut thru (° C.) | Tg (° C.) | Adhesion | |
|---|---|---|---|---|---|---|---|
| | BPDA-MDA | BPDA-SDA | | | | Bond to glass | Bond to aluminum |
| 13 | 0 | 100 | Flexible | 120 | 60 | — | — |
| 14 | 50 | 50 | do | 220 | 128 | + | + |
| 15 | 75 | 25 | do | 310 | 195 | ++ | ++ |
| 16 | 80 | 20 | do | 350 | 210 | ++ | ++ |
| 17 | 85 | 15 | do | 395 | 238 | ++ | ++ |
| 18 | 90 | 10 | do | 400+ | 237 | ++ | ++ |
| 19 | 100 | 0 | do | 450+ | | | |

The adhesion test results are indicated as follows:

—no adhesion
+passing adhesion
++very good adhesion

The data indicates that the presence of a board range of 10–50 mol percent of BPDA–SDA in the coating composition produces passing adhesion; while when the range of BPDA–SDA in 10–25 mol percent very good adhesion is produced.

We claim:
1. A composite material comprising
   (a) a first substrate material selected from the group consisting of glass, quartz, ceramics, metals, carbon, and thermoplastic polymers;
   (b) a second substrate material selected from the same group as said first substrate material; and
   (c) an intermediate bonding agent comprising a polyimide having recurring structural units of the formula:

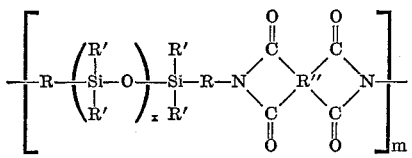

and

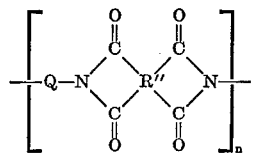

wherein R is a divalent hydrocarbon radical, R' is a monovalent hyrocarbon radical, R" is a tetravalent organic radical which is the residue of a tetracarboxylic acid anhydride, Q is a divalent radical which is the residue of an organic diamine, x is an integer having a value of 1–4, m is an integer greater than 1, n is an integer greater than 1, and the integers designated as m and n are such that the mol percent of m is equal to 5–50% of the polymer.

2. The composite material of claim 1, wherein R is lower alkyl, R' is lower alkyl, R" is a radical derived from or containing a group of at least 2 carbon atoms, wherein each of the 4 carbonyl groups of the dianhydride are attached to adjacent carbon atoms in the tetravalent radical, and Q is a member selected from the group consisting of alkylene containing from 2–20 carbon atoms, cycloalkylene, alkylcycloalkylene, xylylene, phenylene, lower alkyl phenylene,

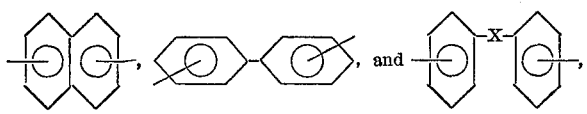

wherein X is a member selected from the group consisting of bivalent aliphatic, cycloaliphatic or aralphatic (having 1–8 carbon atoms)

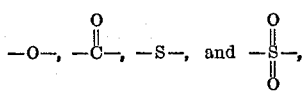

3. The composite material of claim 2, wherein said first substrate and said second substrate are thermoplastic materials selected from the group consisting of polyimides, polyesters, polycarbonates and polyamides.

4. The composite materials of claim 2, wherein said materials are fibers or fabric selected from the group consisting of glass, boron, quartz and carbon fibers.

5. The composite material of claim 4, wherein said materials are fibers or fabric of glass.

6. The composite material of claim 2, wherein said diamino siloxane is 1,3-bis(aminoalkyl)tetramethyldisiloxane, said organic diamine is p,p'-methylene dianiline, and said tetracarboxylic acid dianhydride is benzophenone dianhydride.

7. A method of making a composite material comprising the steps of
   (a) forming in a solvent a fluid of a block copolymer having recurring structural units of the formula:

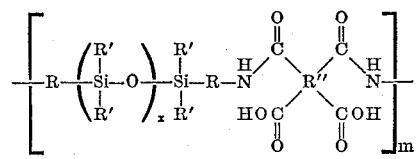

and

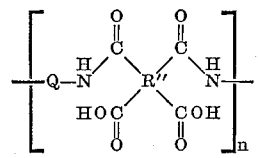

wherein R is a divalent hydrocarbon radical, R' is a monovalent hydrocarbon radical, R" is a tetravalent organic radical which is the residue of a tetracarboxylic acid dianhydride, Q is a divalent radical which is the residue of an organic diamine, x is an integer having a value of 1–4, m is an integer greater than 1, n is an integer greater than 1, and the integers designated by m and n are such that the mol percent of m is equal to 5–50% of the polymer;
   (b) applying a coating of the fluid to the surface of a first substrate material selected from the group consisting of glass, quartz, ceramics, metals, carbon and thermoplastic polymers;
   (c) attaching to said coated first material a second substrate material selected from the same group as said first material, and
   (d) converting said block copolymer of the formula set forth above to the corresponding imide to form a bonded composite material.

8. The method of claim 7, wherein R is lower alkyl, R' is lower alkyl, R" is a radical derived from or containing a group of at least 2 carbon atoms, wherein each of the 4 carbonyl groups of the dianhydride are attached to adjacent carbon atoms in the tetravalent radical, and Q is a member selected from the group consisting of alkylene containing from 2–20 carbon atoms, cycloalkylene, alkylcycloalkylene, xylylene, phenylene, lower alkylphenylene,

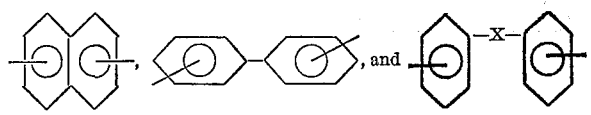

wherein X is a member selected from the group consisting of bivalent aliphatic, cycloaliphatic or aralphatic (having 1–8 carbon atoms),

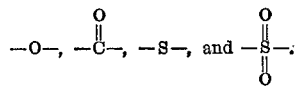

9. The method of claim 8, wherein said block copolymer is prepared by effecting a reaction of a mixture of ingredients comprising a diamino siloxane of the general formula:
(1)

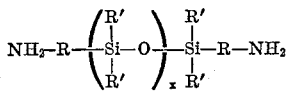

an organic diamine compound of the formula:
(2)

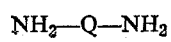

and (3) a tetracarboxylic acid dianhydride having the formula:

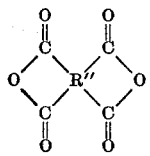

wherein R, R', R", Q and $x$ are defined as hereinabove.

10. The method of claim 9, wherein said diamino siloxane is 1,3-bis(aminoalkyl)tetramethyldisiloxane, said organic diamine is p,p'-methylene dianiline, and said tetracarboxylic acid dianhydride is benzophenone dianhydride.

11. The method of claim 8, wherein said first substrate is a thermoplastic polymer and said second substrate is a thermoplastic polymer.

12. The method of claim 11, wherein said first substrate and said second substrate are selected from the group consisting of polyimides, polyesters, polycarbonates, and polyamides.

13. The method of claim 8, wherein said composites are formed from inorganic substrate materials of fibers or fabric selected from the group consisting of glass, boron, quartz, and carbon fibers.

14. The method of claim 13, wherein said materials are fibers or fabric of glass.

15. The method of claim 8, wherein the substrate materials in particulate form are selected from the group consisting of metals, carbon, quartz, alumina, ceramics and mixtures thereof.

References Cited

UNITED STATES PATENTS

| | | | |
|---|---|---|---|
| 3,288,754 | 11/1966 | Green | 161—206 X |
| 3,392,144 | 7/1968 | Holub | 260—46.5 E |
| 3,553,282 | 1/1971 | Holub | 260—824 R |
| 3,598,783 | 8/1971 | Holub et al. | 260—46.5 E |
| 3,598,784 | 8/1971 | Holub et al. | 260—46.5 E |
| 3,598,785 | 8/1971 | Holub et al. | 260—46.5 E |
| 3,637,550 | 1/1972 | Spraner | 161—207 |

CHARLES E. VAN HORN, Primary Examiner

U.S. Cl. X.R.

161—193, 213, 227, 206, 207, 176; 156—329; 260—46.5 E, 824 R